June 26, 1951 L. M. HOLLINGSWORTH 2,558,435

AUTOMATIC FREQUENCY CONTROL SYSTEM

Filed Oct. 19, 1945 2 Sheets-Sheet 1

INVENTOR.
LOWELL M. HOLLINGSWORTH
BY
William D. Hall.
ATTORNEY

June 26, 1951 L. M. HOLLINGSWORTH 2,558,435

AUTOMATIC FREQUENCY CONTROL SYSTEM

Filed Oct. 19, 1945 2 Sheets-Sheet 2

*INVENTOR.*
LOWELL M. HOLLINGSWORTH
*BY*
William D. Hall.
*ATTORNEY*

Patented June 26, 1951

2,558,435

UNITED STATES PATENT OFFICE 2,558,435

AUTOMATIC FREQUENCY CONTROL SYSTEM

Lowell M. Hollingsworth, Cambridge, Mass., assignor, by mesne assignments, to the United States of America as represented by the Secretary of War Application October 19, 1945, Serial No. 623,388

4 Claims. (Cl. 250—36)

This invention relates in general to radio apparatus and more specifically to a system for automatic frequency stabilization of oscillators and similar apparatus.

In many types of radio object-locating devices it is necessary to control the frequency of local oscillators so that the intermediate frequency, resulting from mixing the output of the local oscillator with the signal, will be constant. The frequency of the local oscillator tends to change because of load and temperature variations and other factors. It is sometimes desirable to change the frequency of the signal, thereby necessitating a change in frequency of the local oscillator so that the intermediate frequency will remain the same as before. The change in local oscillator frequency must be a rapid one, as in many radio object-locating devices the signal consists of recurring pulses of extremely short duration. When the local oscillator is producing an output of such a frequency that the resulting intermediate frequency does not have the desired value, a complete signal pulse or chain of pulses may be lost by attenuation unless an immediate correction of the local oscillator frequency is made.

It is an object of this invention to provide a means which will automatically stabilize the frequency of a local oscillator.

A further object is to provide a means for stabilizing an I.-F. voltage.

Another object is to provide a means to control the frequency of an oscillator and to provide a second means which, should said first means fail to control said oscillator, will place said first means in condition to control the frequency of said oscillator.

Generally, this invention consists of a discriminator connected to a trigger circuit. The output voltage of the trigger circuit is large or small depending upon which tube of the trigger circuit is conducting. This voltage is used to change the frequency of the oscillator. During normal operation, with control established, the trigger circuit alternates rapidly between its two stable conditions. If, however, control is lost, the output voltage will be constant; and, after a specified time, a relay circuit operates a thermal switch and changes the magnitude of the output to again restore the oscillator to the proper frequency.

Figure 1:
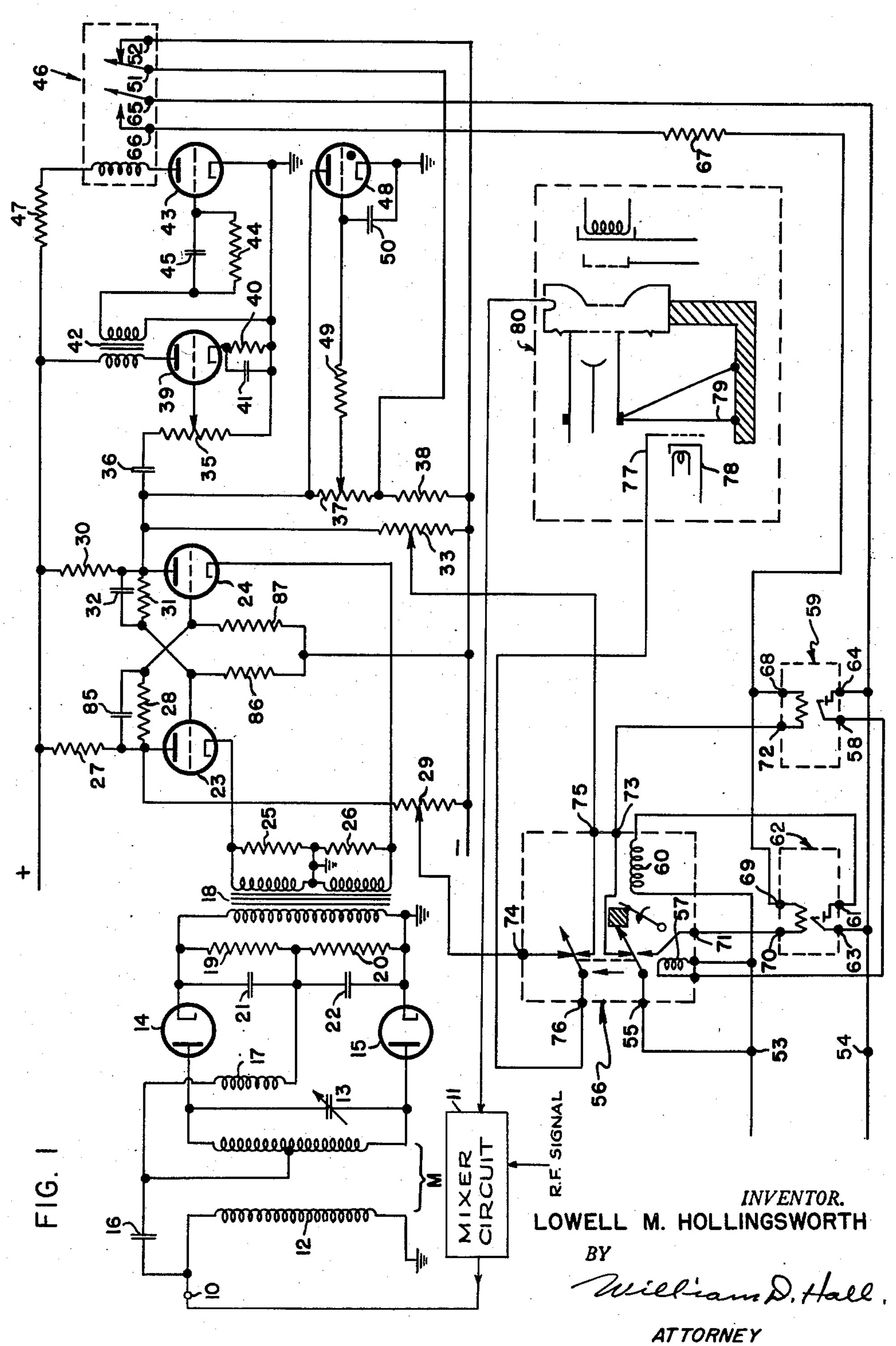
Figure 2:
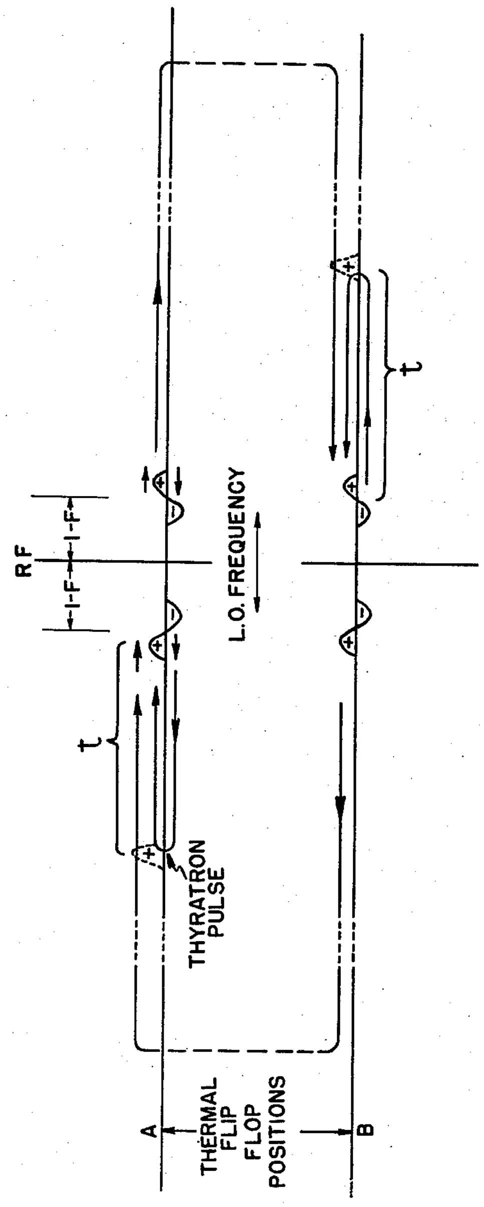

Other objects, features and advantages of this invention will suggest themselves to those skilled in the art and will become apparent from the following description of the invention taken in connection with the accompanying drawings in which:

Fig. 1 is a circuit diagram illustrating the principles embodied in this invention; and Fig. 2 is a chart which shows the relation between the local oscillator frequency and discriminator output, and also illustrates the possible variations in the local oscillator frequency when it is not held at a fixed frequency by the control circuit.

Referring now more particularly to Fig. 1, mixer circuit 11 is connected to terminal 10 of the primary of a transformer 12. The secondary of transformer 12 is connected across a capacitor 13 and its terminals are connected to the plates of diodes 14 and 15 respectively. Terminal 10 is also connected through a capacitor 16 to a center tap of the secondary of transformer 12 and to one side of a choke 17. The cathodes of diodes 14 and 15 are connected together by the primary of a transformer 18. Resistors 19 and 20 are connected in series across the primary of transformer 18. Capacitors 21 and 22 are also connected in series across the primary of transformer 18. The junction of resistors 19 and 20 is connected to the junction of capacitors 21 and 22 and also to the choke 17.

The secondary of transformer 18, the center point of which is grounded, is connected between the cathodes of tubes 23 and 24. Resistors 25 and 26 are connected in series between cathodes of tubes 23 and 24. The junction of resistors 25 and 26 is grounded. The plate of tube 23 is connected through a resistor 27 to a source of positive potential and also to the grid of tube 24 through a resistor 28 which is bypassed by a capacitor 85. The plate of tube 23 is also connected through a potentiometer 29 to a negative potential. The grid of tube 23 is connected to a negative voltage source through resistor 86 and the grid of tube 24 is connected to a negative voltage source through resistor 87.

The plate of tube 24 is connected through resistor 30 to a positive potential source and also to the grid of tube 23 through resistor 31 which is bypassed by capacitor 32. The plate of tube 24 is also connected through a potentiometer 33 to a source of negative potential. A further connection from plate of tube 24 is made to a potentiometer 35 through a capacitor 36. Potentiometer 35 has one terminal grounded. The plate of tube 24 is also connected through a potentiometer 37 and resistor 38 to a negative potential source. The movable contact on potentiometer 35 is connected to the grid of a tube 39. The cathode of tube 39 is connected to ground through a resistor 40 and capacitor 41 in parallel. The plate of tube 39 is connected through the primary of transformer 42 to a source of positive potential. The grid of a tube 43 is connected through resistor 44 and capacitor 45 in parallel to one terminal of the secondary of transformer 42. The other terminal of the secondary of transformer 42 is grounded. The cathode of tube 43 is also grounded. The plate of tube 43 is connected to a positive potential source through the winding of a relay 46 and a resistor 47 in series.

Tube 48 is a thyratron and its plate is connected directly to the plate of tube 24. The cathode of tube 48 is grounded. The grid of tube 48 is connected through resistor 49 to the sliding contact on potentiometer 37 and the grid of tube 48 is also bypassed to ground through capacitor 50.

The junction between potentiometer 37 and resistor 38 is connected to terminal 51 of relay 46. Terminal 52 of relay 46 is connected to the terminal of resistor 38 to which negative potential is applied. The normal unoperated condition of relay 46 is such that terminals 51 and 52 are electrically connected together, thereby shunting resistor 38.

A suitable source of electrical power (not shown) is connected between terminals 53 and 54. Terminal 53 is connected to terminal 55 of a latching relay 56 and through operational winding 57 of relay 56 to terminal 58 of a thermal relay 59. Terminal 53 is also connected through release winding 60 of relay 56 to terminal 61 of a thermal relay 62. Terminal 54 is connected to terminal 63 of thermal relay 62, terminal 64 of thermal relay 59 and to terminal 65 of relay 46. Terminal 66 of relay 46 is connected through a resistor 67 to terminal 68 of thermal relay 59 and terminal 69 of thermal relay 62. Terminal 70 of thermal relay 62 is connected to terminal 71 of relay 56. Terminal 72 of thermal relay 59 is connected to terminal 73 of relay 56. Thermal relays 59 and 62 are thermally operated relays. Terminals 58 and 64 normally are not connected together electrically. When current passes through the heating element connected between terminals 68 and 72, heat is produced and operates a contact to connect terminals 64 and 58 together. Similarly, terminals 61 and 63 normally are not connected together electrically. When current passes through the heating element connected between terminals 69 and 70, heat is produced and operates a contact to connect terminals 61 and 63 together.

The movable contact of poentiometer 29 is connected to terminal 74 of relay 56. The movable contact of potentiometer 33 is connected to terminal 75 of relay 56. The output is taken from terminal 76 of relay 56 which is alternatively connected to either of the aforesaid potentiometer contacts.

Output terminal 76 is connected to a grid 77 which controls the electron flow from the cathode 78 to a strut 79 connected to the cavity resonator of an oscillator tube 80. The oscillator 80 is coupled to mixer circuit 11, which combines the output of the oscillator with a received signal to produce the I.-F. signal supplied to transformer 12. Strut 79 is heated by the current passing through it and is arranged to expand or contract with changes in temperature. Expansion or contraction of strut 79 alters the tuning of the cavity resonator and changes the frequency of the oscillator.

In operation, the I.-F. voltage whose frequency is to be controlled is applied across terminals 10 and 11. This I.-F. voltage is obtained by heterodyning a radio-frequency voltage with the local oscillator voltage. Diodes 14 and 15, operating in conjunction with the associated apparatus, produce a voltage output in transformer 18, the polarity and magnitude of which are functions of the discrepancy of the frequency of the incoming voltage in relation to the frequency of the tuned circuit consisting of transformer 12 and capacitor 13. This is conventional discriminator action, the operation of which is explained, for example, on pages 585, 586 and 587 of the "Radio Engineer's Handbook" by F. E. Terman, published by McGraw-Hill Book Company, Inc., in 1943.

The output of transformer 18 is applied in a push-pull manner to the cathodes of the trigger circuit tubes 23 and 24. The trigger circuit, consisting of tubes 23 and 24 and accompanying resistors and capacitors, operates as a function of the output of transformer 18. A rise in the cathode potential of tube 23 is accompanied by a lowering of the cathode potential of tube 24. Thus tube 24 conducts heavily and tube 23 is cut off as in conventional trigger circuit action. A further increase in the potential of the cathode of tube 23 is accompanied by a further decreasing of the potential of cathode of tube 24. This action tends to make tube 24 conduct more heavily and does not change the setting of the trigger circuit. A change of polarity of the cathode trigger is required to reverse the setting of the trigger circuit. The output from the plate of tube 23 of the trigger circuit is applied to the terminal 74 of relay 56 by means of the variable contact of potentiometer 29 and is used to control the frequency of the oscillator tube when relay 56 is in such a position that terminals 74 and 76 are connected. The output from the plate of tube 24 of the trigger circuit is applied to terminal 75 of relay 56 by the variable contact of potentiometer 33 and is used to control the frequency of the oscillator tube when relay 56 is in such a position that terminals 75 and 76 are connected.

The output from the plate of tube 24 of the trigger circuit is also fed to tube 39 where it is amplified and applied to tube 43. Tube 39 and accompanying apparatus function as an amplifier. The output from said amplifier is applied to tube 43, which, with its accompanying apparatus, acts as a grid leak detector. When proper frequency control is established, the trigger circuit, comprising tubes 23 and 24, alternates rapidly between its two stable conditions. The resulting voltage pulses in the output thereof are amplified by tube 39 and applied to tube 43. The grid leak detection action limits the plate current in tube 43 when these pulses are present. If the trigger circuit remains in one stable condition for a long period, thus indicating improper frequency control, the charge on capacitor 45, produced by the previous grid leak detector action, leaks off and causes tube 43 to conduit heavily, thereby actuating the relay 46.

Relay 56, together with thermal relays 59 and 62, act as a thermal flip-flop switch. The contacts of relay 56 connected to terminals 55 and 76 are mechanically connected together and the indicated position is with terminal 76 connected to terminal 74 and terminal 55 connected to terminal 73. When current passes through the operational coil 57, the contacts connected to terminals 55 and 76 change their position to connect terminal 55 to terminal 71 and terminal 76 to terminal 75. The contacts are secured in this position until current passes through the release coil 60, at which time the contacts return to the indicated position. Neither operational coil 57 nor release coil 60 will be energized unless relay 46 is actuated.

When relay 46 is actuated, terminal 65 thereof is connected to terminal 66 which causes current to flow through the heater of thermal relay 59, if terminal 55 is connected to terminal 73, this being effective after a sufficient interval of time to close the contact in thermal relay 59 and connect terminal 64 to terminal 58, thereby causing current to flow through operational coil 57. Such action changes the output voltage connection from terminal 74 to terminal 75. Similarly, if terminal 55 is connected to terminal 71, when relay 46 is actuated, current flows through the heater of thermal relay 62 and, after a sufficient interval of time, closes the contact in thermal relay 62 and connects terminal 61 to terminal 63, thereby causing current to flow through release coil 60. This action changes the output voltage connection from terminal 75 to terminal 74.

Furthermore, when relay 46 is actuated, resistor 38 is no longer shunted through terminals 51 and 52. If the trigger circuit is stable, with tube 24 conducting, when relay 46 is actuated, the grid of tube 48 will rise exponentially due to the resistor and capacitor in that circuit but tube 48, a thyratron, will not conduct, as the plate potential will be low. If, however, the trigger circuit is stable, with tube 24 not conducting, when relay 46 is actuated, the plate potential of tube 48 will rise and in time $t$, when the grid reaches a particular value, thyratron 48 will fire, causing a voltage drop in resistor 30 which is passed through resistor 31 and capacitor 32 in apparallel to the grid of tube 23 thereby causing tube 23 to be cut off and tube 24 to conduct. This action lowers the plate voltage on tube 48, causing it to be cut off.

Fig. 2 illustrates the use of the thyratron tube 48 and indicates diagrammatically the possible paths of frequency search the local oscillator will follow when not locked on the proper frequency. The local oscillator frequency is plotted horizontally and the vertical coordinate represents discriminator output voltage. Part A represents the paths of frequency search and discriminator output when the local oscillator is controlled by one tube of the trigger circuit. Part B represents the paths of frequency search and discriminator output when the local oscillator is controlled by the other tube of the trigger circuit. That is, the conditions which prevail for the two positions of relay 56 are represented by parts A and B of Fig. 2. The dotted lines indicate the reversing action of relay 56 when the local oscillator is following certain paths of operation. The action of the thyratron is represented by a pulse as it effectively reverses the searching path of the local oscillator. It will be noted that the thyratron greatly reduces the search time. $t$ is a time slightly greater than the time required for the local oscillator to sweep from one sideband to the other. The time required to operate the thermal flip-flop switch is great enough to allow oscillator tube 80 to sweep from one end of the frequency band to the other.

While there has been described what is at present considered to be the preferred embodiment of this invention, it will be obvious to those skilled in the art that various changes and modifications may be made therein without departing from the scope of the invention as set forth in the appended claims.

The invention claimed is:

1. In combination, an oscillator tube including thermal means for controlling the oscillator frequency, a discriminator circuit for receiving a beat frequency between the aforementioned oscillator frequency and a signal, said discriminator circuit being tuned to a predetermined frequency to produce an output of one polarity if the beat frequency is above said predetermined frequency and of the opposite polarity if the beat frequency is below said predetermined frequency, a trigger circuit including first and second electronic discharge devices for receiving the output of said discriminator circuit and arranged so that one of said electronic discharge devices conducts when the output of said discriminator circuit is of one polarity and the other of said electronic discharge devices conducts when the output of said discriminator is of another polarity, means including a third electronic discharge device whereby when the first of said electronic discharge devices conducts current continuously for a sufficient interval of time said third electronic discharge device conducts current heavily, thereby stopping flow of current in said first electronic discharge device and starting a flow of current in said second electronic discharge device, means whereby the frequency of said oscillator tube is controlled as a function of the output of said trigger circuit, means including a fourth electronic discharge device whereby when one of said first and second electronic discharge devices conducts continuously for a sufficient interval of time said fourth electronic discharge device conducts current heavily, thereby reversing the effect said trigger has on the frequency of said oscillator tube.

2. An automatic frequency control system for use with a superheterodyne receiver, said system comprising means for varying the frequency of the local oscillator of said receiver, said frequency varying means being arranged to vary said oscillator frequency in a first direction in response to a signal having a first characteristic being applied thereto, and in the opposite direction in response to a signal having a second characteristic being applied thereto, a circuit for generating a signal, said circuit having two alternative modes of operation such that said signal has said first characteristic when said circuit operates in its first mode, and has said second characteristic when said circuit operates in its second mode, means for applying said signal to said frequency-varying means, a frequency discriminator connected between the mixer of said receiver and said circuit, said frequency discriminator producing an output which is applied to said circuit for effecting a reversal in the mode of operation thereof in response to the frequency of the output of said mixer changing from one side of the intermediate frequency of said receiver to the other, said frequency discriminator being effective in controlling the operation of said circuit only over a limited range of frequencies in the vicinity of said intermediate frequency, pulse generating means coupled to said circuit, said pulse generating means being arranged to produce a pulse in response to said circuit operating in said first mode for more than a predetermined time, and means for applying said pulse to said circuit to effect a reversal in the mode of operation of said circuit to thereby bring said mixer output within said limited range of frequencies wherein said discriminator has control.

3. An automatic frequency control system for use with a superheterodyne receiver, said system comprising means for varying the frequency of the local oscillator of said receiver, said frequency varying means being arranged to vary said oscillator frequency in a first direction in response to a signal having a first characteristic being applied thereto, and in the opposite direction in response to a signal having a second characteristic being applied thereto, a circuit for generating first and second signals, said circuit arranged to have two alternative modes of operation such that said first signal has said first characteristic and said second signal has said second characteristic when said circuit operates in said first mode, and said first signal has said second characteristic and said second signal has said first characteristic when said circuit operates in said second mode, switching means for applying said first signal in a first position thereof and said second signal in a second position thereof to said frequency-varying means, a frequency distcriminator connected between the mixer of said receiver and said circuit, said frequency discriminator producing an output which is applied to said circuit for effecting a reversal in the mode of operation thereof in response to the frequency of the output of said mixer changing from one side of the intermediate frequency of said receiver to the other, said frequency discriminator being effective in controlling the operation of said circuit only over a limited range of frequencies in the vicinity of said intermediate frequency, normally inoperative activating means for periodically effecting the switching of said switching means between the first and second positions thereof and means coupled between said circuit and said activating means for rendering said activating means operative in response to said circuit operating in either one of its two modes for more than a given time, whereby the frequency of said local oscillator is scanned back and forth over a wide band of frequencies to bring the frequency of said mixer output within said limited range of frequencies wherein said discriminator has control.

4. The system defined in claim 3, further including pulse generating means coupled to said circuit, said pulse generating means being arranged to produce a pulse in response to said circuit operating in said first mode for more than a predetermined time, said predetermined time being less than the periodicity of said activating means, and means for applying said pulse to said circuit to effect a reversal in the mode of operation of said circuit to thereby reduce to a minimum the amount and magnitude of frequency hunting in restoring said mixer output to within the control of said discriminator.

LOWELL M. HOLLINGSWORTH.

REFERENCES CITED

The following references are of record in the file of this patent:

UNITED STATES PATENTS

| Number | Name | Date |
|---|---|---|
| 2,211,750 | Humby et al. | Aug. 20, 1940 |
| 2,267,453 | Foster | Dec. 23, 1941 |
| 2,434,294 | Ginzton | Jan. 13, 1948 |